3,260,678
Patented July 12, 1966

1

3,260,678
CATALYST COMPOSITION, PARTICULARLY FOR CATALYZING OXIDATION OF HYDROGEN CHLORIDE TO CHLORINE
Willem F. Engel and Freddy Wattimena, both of Amsterdam, Netherlands, assignors to Shell Oil Company, New York, N.Y., a corporation of Delaware
No Drawing. Original application Jan. 17, 1961, Ser. No. 83,134, now Patent No. 3,210,158, dated Oct. 5, 1965. Divided and this application July 19, 1965, Ser. No. 473,165
Claims priority, application Netherlands, Jan. 20, 1960, 247,564
5 Claims. (Cl. 252—441)

This is a division of applicants' copending application Serial No. 83,134, filed January 17, 1961, now U.S. 3,210,158, issued Oct. 5, 1965.

The invention relates to the production of chlorine by a process related to the Deacon process, in which hydrogen chloride is oxidized with air with the aid of a copper compound as catalyst.

Better results have been obtained according to the invention than were possible with any process hitherto known. Very high conversions, substantially equal to the conversions corresponding with the equilibrium are obtained at high space velocities and relatively low temperatures. The low temperatures also have the following advantages: (a) the copper compounds are not volatile, (b) the conversion corresponding with the equilibrium is high and therefore little initial material is to be recycled and (c) there is practically no corrosion.

In the process of the invention a gaseous mixture containing hydrogen cholride and oxygen is passed over a catalyst containing (a) one or more copper chlorides, (b) one or more chlorides of metals of the rare metal group, the ratio in atoms of rare earth metal to copper being at least 0.1 and (c) one or more alkali metal chlorides. Whenever reference is made here to chlorides, this term also includes oxychlorides.

In the preparation of the present catalysts the starting materials may be compounds other than chlorides, provided these other compounds are converted into chlorides and/or oxychlorides under the influence of the gaseous mixture containing hydrogen chloride and oxygen.

Among the rare earth metals the lanthanides are preferred and among the lanthanides particularly those the highest possible valency of which is lower than 4. Lanthanides with a valency which is always lower than 4 are lanthanum and those with atomic numbers between 59 and 64, both inclusive, to wit praseodymium, neodymium, illinium, samarium, europium and gadolinium. Particularly recommended is a mixture in which lanthanum is present together with one or more lanthanides with atomic numbers between 59 and 64, for instance a mixture known as didymium. This mixture mainly consists of lanthanum and neodymium, together with smaller quantities of praseodymium and samarium. The following analysis is given by way of example:

| | Percent |
|---|---|
| $La_2O_3$ | 45 |
| $Nd_2O_3$ | 38 |
| $Pr_6O_{11}$ | 11 |
| $Sm_2O_3$ | 4 |
| Various | 2 |

2

In view of the activity of the catalyst, atomic ratios of rare earth metals to copper of at least 0.15 are preferable. The highest activities of these catalysts are obtained when the atomic ratio of alkali metal to copper is between 0.6 and 3, particularly when this atomic ratio is not less than 0.8 and not more than 1.2.

The activity of these catalysts is also greatly increased when the mixture of compounds of copper, one or more rare earth metals and one or more alkali metals is entirely or partly present in the molten state.

The catalysts according to the invention are preferably supported on carriers. Various materials (pumice, ceramic material, etc.) usually employed as such in related processes may also be used as carriers in the present case, but by far the best results are obtained with silica gel as carrier, particularly when the mixture of compounds of copper, one or more rare earth metals and one or more alkali metals is entirely or partly present in a molten state, especially with silica gel having a surface area of at least 200 m.²/g. with an average pore diameter of at least 60 A.

In addition to the surface area, the average pore diameter of the carrier is important in the present case. Although the activity of catalysts generally increases with the surface area, in the case of the catalysts according to the invention, in which the active components are entirely or partly present in the form of a melt, this only applies insofar as the port diameter does not become too small. Presumably, the melt of catalysts constituents should be capable of wetting the inner walls of the pores without making these pores inaccessible to the reacting gas mixture.

The catalyst compositions according to the invention are excellently suitable for use in a fluidized state, especially when supported on a suitable carrier. This applies particularly when the above-mentioned ratios of copper to alkali metals are observed.

Comparative experiments in which various alkali metal compounds in mixtures according to the invention were used under similar conditions, showed that with the optimum alkali metal copper ratios, potassium, sodium and lithium differ very little as regards activity. When using sodium or lithium compounds, the alkali metal/copper ratio could be raised considerably in fixed catalyst beds without substantially reducing the activity. This was not, however, the case when potassium compounds were used. For all alkali metals, a reduction of the said ratio below the optimum value caused a very sharp decline in activity. With regard to fluidizability, mixtures in which potassium was used as the alkali metal proved to be the least sensitive to fluctuations in the alkali metal/copper ratio. It was found that deviations from the favorable alkali metal/copper ratios while the catalyst is being used may lead to deposition of crystals on the surface of the carrier particles and in the pores thereof. The crystals could be observed through the microscope, and their nature determined in polarized light. It is assumed that on the one hand this deposition of crystals reduces the accessibility of the pores, and hence the activity, and that on the other hand it impairs the fluidizability by changing the nature of the particle surface.

To facilitate the formation or maintenance of a melt it may be advantageous to use mixtures of compounds of different alkali metals. For the same purpose, compounds, preferably chlorides of other metals, such as silver, lead or tin may be incorporated in the mixture.

Suitable temperatures for carrying out the process according to the invention lie mainly between 300° C. and 425° C. particularly between 330° C. and 400° C., but higher and lower temperatures are possible in principle.

The carrier-supported catalysts according to the invention generally have a copper content of between 1 and 20% by weight, calculated as metal referred to the total of metals plus carrier. The total rare earth metal content generally lies within corresponding limits, calculated in the same manner.

Also embraced in our invention, is the production of the above-mentioned new catalysts from chlorides of copper, rare earth metals and alkali metals and moreover a process is contemplated in which, instead of compounding the catalyst from chlorides, a pre-catalyst is prepared either entirely or partly from compounds other than chlorides (possibly partly from chlorides), which pre-catalyst may be converted by the action of gaseous mixtures containing hydrogen chloride and oxygen into a catalyst suitable for the production of chlorine. The said compounds other than chlorides, which are converted into chlorides by the action of gaseous mixtures containing hydrogen chloride and oxygen, are, for example, oxides, hydroxides, nitrates, carbonates, acetates, etc. The various metal compounds may be supported on carriers in a conventional manner by adsorption, precipitation, etc.

Example I.—Production of the catalysts

The carrier was dried for two hours at 500° C. and then impregnated with a solution of the chlorides of copper, one or more rare earth metals and one or more alkali metals. In each experiment a quantity of carrier was mixed with the maximum quantity of solution that could be taken up by the pores of the carrier. The concentration of each content of this constituent was incorporated in the carrier. The impregnated carrier was dried and heated for three hours in an air stream to 250° C.

The contents specified are always the percentages by weight of the metal in question, calculated with reference to the total weight of the metals present and the carrier. Thus, if the amounts specified are 5% Cu, 5% Ce, 3% K, this means that for 5 parts by weight of Cu, 5 parts by weight of Ce and 3 parts by weight of potassium, $100-(5+5+3)=87$ parts by weight of carrier were also present. As the metals are present in the form of compounds, the metal contents in the catalyst as a whole are in fact lower than the values specified.

Except where otherwise stated, fixed catalyst beds were used.

Example II.—Effect of alkali compounds and the alkali metal/copper ratio

The carrier used was silica gel having a particle size of 75–150 microns, an average pore diameter of 30 A. and a surface area of 390 m.²/g. The catalyst contains 5% copper and 5% didymium. The atomic ratio of total of alkali metal to copper was invariably 1. The HCl/air ratio was the stoichiometric one. The space velocity was 40 liters of gaseous HCl per kg. of catalyst per hour. The varied conditions and the resulting conversion percentages are summarized in the following table.

| Percent by Weight with Reference to Alkali Metal | | | Percent HCl Converted into Cl². | |
|---|---|---|---|---|
| K | Na | Li | at 300° C. | at 350° C. |
| 3.1 | | | 32 | 76 |
| 2.1 | 0.60 | | 45 | 78 |
| 1.56 | 0.92 | | 36 | 79 |
| 1.33 | | 0.32 | 44 | 79 |
| 2.55 | | 0.10 | 37 | 78 |
| Equilibrium | | | 85 | 79.5 |

Example III.—Effect of rare earth metals

To enable the effect of various rare earth metals to be compared, catalysts were prepared containing 5% copper, 5% of a rare earth metal and 5% sodium, supported on silica gel having an average pore diameter of 30 A. and a surface area of 688 m.²/g. The stoichiometric HCl-air mixture was passed over the fixed catalyst beds at a space velocity of 40 liters of gaseous HCl per kg. of catalyst per hour. The following table shows the conversion percentages at various temperatures. The results of two experiments are also given in which the catalyst contained no rare earth metal and which are therefore outside the scope of this invention.

| Rare Earth Metal | Temperature— | | |
|---|---|---|---|
| | 300° C. | 350° C. | 400° C. |
| None (5% Cu, no alkali) | | 7.5 | 31.5 |
| None (5% Cu, 5% Na) | | 23 | 52 |
| Lanthanum | 31 | 73 | 69.5 |
| Cerium | 38 | 46.5 | 60 |
| Praseodymium | 29 | 71 | 69 |
| Neodymium | 30 | 73 | 71 |
| Samarium | 38 | 73 | 68 |
| Didymium | 32 | 72 | 71 |
| Europium | 43 | 74.5 | 72 |
| Gadolinium | 35 | 69 | 72 |
| Dysprosium | 31 | 63.5 | |
| Yttrium | 31 | 62 | |
| Ytterbium | 19 | 45 | |
| Scandium | 17 | 42 | |
| Equilibrium | 85 | 79.5 | 73 |

Example IV.—Effect of the concentration of the active components in the catalyst; effect of the average pore diameter Carrier: silica gel. Space velocity: 40 liters of gaseous HCl per kg. of catalyst per hour.

| Cu, percent | Didymium | Na, percent | Average Pore Diameter A. | Surface Area. m²/g. | Percent HCl Converted into Cl².— | |
|---|---|---|---|---|---|---|
| | | | | | at 300° C. | at 350° C. |
| 1 | 1 | 1 | 30 | 688 | 16 | 33 |
| 5 | 5 | 5 | 30 | 688 | 32 | 72 |
| 1 | 1 | 1 | 140 | 313 | 15 | 56 |
| 5 | 5 | 5 | 140 | 313 | 39 | 79 |
| 10 | 10 | 10 | 140 | 313 | 32 | 77 |

Example V.—Effect of the concentration of rare earth metal in the catalyst

Carrier: silica gel. Average diameter of pores: 80 A. Surface area: 390 m.²/g. Copper content: 5%. Alkali metal content: 3.1% potassium. Space velocity: 80 liters gaseous HCl per kg. catalyst per hour. HCl and air in stoichiometric ratio. Temperature: 350° C. Rare earth metal: didymium.

| Air/HCl Volume | 1.19 | | 1.60 | |
|---|---|---|---|---|
| Temperature, °C | 350 | 365 | 350 | 365 |
| Space Velocity, Liters HCl/kg. Cat. per Hour: | | | | |
| 40 | 78.5 | | 80 | 79.5 |
| 80 | 75 | | 80 | 80 |
| 120 | 71 | 75 | 77.5 | 79 |

| Percent rare earth metal in catalyst: | Conversion percent |
|---|---|
| 2.5 | 62 |
| 5 | 75 |
| 10 | 79 |

*Example VI.—Effect of average pore diameter; effect of temperature*

Carrier: silica gel. Copper content: 5%. Content of rare earth metal: 5%. Alkali metal content: 5% sodium. HCl and air in a stoichiometric ratio. The table shows the varied conditions and the conversion percentages.

| Temperature, °C | | | 300 | 350 | | 400 | |
|---|---|---|---|---|---|---|---|
| Space velocity, liters gaseous HCl/kg. cat./hour | | | 40 | 40 | 80 | 40 | 80. |
| Rare Earth Metal | Average Pore Diam. | Surface Area, M.²/g. | | | | | |
| Cerium | 30 | 688 | 38 | 66 | | 70 | |
| Do | 80 | 390 | 34.5 | 70 | | 71 | |
| Didymium | 30 | 688 | 38.5 | 73.5 | 65 | 69 | 70 |
| Do | 80 | 390 | 39 | 78.5 | 69 | 71 | 71.5 |
| Do | 140 | 313 | 39 | 79 | 76 | 73 | 72 |
| Equilibrium | | | 85 | 79 | | 73 | |

The cerium used in this example was of technical quality, with 35 percent by weight of didymium.

*Example VII.—Effect of operating time*

Carrier: silica gel. Average pore diameter: 140 A. Surface area: 313 m.²/g. Particle size: 2–3 mm. 5% Cu, 5% didymium, 3.1% K. HCl and air in a stoichiometric ratio, space velocity 80 liters of gaseous HCl per kg. of catalyst per hour. Temperature: 350° C.

| Operating time, hours | Conversion, percent |
|---|---|
| 1 | 75 |
| 20 | 78.5 |
| 40 | 78 |
| 60 | 76.5 |
| 266 | 76.5 |
| 600 | 76.5 |

Afer a starting-up period, the activity remained entirely constant from 50 to 600 hours. The loss of copper was extremely low (<0.015%, calculated as before). No disintegration of the catalyst particles was noticed. At the end of the experiment the space velocity was increased to 120 and 160 liters of gaseous HCl per kg. of catalyst per hour, giving a conversion percentage of 74.5 and 73.5, respectively.

*Example VIII.—Effect of the air/HCl ratio*

Carrier: silica gel, obtained by extracting silica-alumina containing 12% $Al_2O_3$ for 24 hours at 20° C. with 4 NHCl. Particle size 20–120 microns. Average pore diameter 36 A. surface area approximately 800 m.²/g. 5% Cu, 5% didymium, 3.1% K.

The table shows the varied conditions and the conversion percentages from HCl to $Cl_2$.

*Example IX.—Fluidized catalyst bed*

The catalyst was the same as in Example VIII. The catalyst was kept in a fluidized state by a stream of air and HCl mixed in a stoichiometric ratio.

The following table gives the conversion percentages to chlorine at various temperatures and space velocities. Equilibrium was still reached at 365° C. and a space velocity of not less than 160 liters of HCl/kg. of catalyst per hour.

| Space Velocity, Liters HCl/kg. per hour | 120 | 160 |
|---|---|---|
| Temperature, °C.: | | |
| 350 | 75 | 70 |
| 365 | 77.5 | 77.5 |

We claim as our invention:

1. A catalyst compositon, particularly suitable for catalyzing the oxidation of hydrogen chloride to chlorine in the presence of an oxygen-containing gas, consisting essentially of (A) a chloride of copper in combination with (B) didymium chloride, (C) an alkali metal chloride, and (D) a silica gel catalyst support having a surface area of at least 200 m.²/g. with an average pore diameter of at least 60 A., wherein the atomic ratio of didymium to copper is at least about 1.0 and the atomic ratio of alkali metal to copper is in the range of from about 0.6:1 to about 3:1.

2. The catalyst compositon, particularly suitable for catalyzing the oxidation of hydrogen chloride to chlorine in the presence of an oxygen-containing gas, consisting essentially of (A) copper chloride in combination with (B) didymium chloride, (C) an alkali metal chloride, and (D) a silica gel catalyst support having a surface area of at least 200 m.²/g. with an average pore diameter of at least 60 A., said catalyst composition containing from about 1 to about 20% by weight of copper and from about 1 to about 20% by weight of didymium, and wherein the atomic ratio of alkali metal to copper is in the range of from about 0.6 to about 0.3.

3. The catalyst composition in accordance with claim 2 wherein said alkali metal chloride is potassium chloride.

4. The catalyst composition in accordance with claim 2 wherein said alkali metal chloride is sodium chloride.

5. The catalyst composition in accordance wiht claim 2 wherein said alkali metal chloride is lithium chloride.

References Cited by the Examiner

UNITED STATES PATENTS

| | | | |
|---|---|---|---|
| 2,204,172 | 6/1940 | Balcar | 23—219 |
| 2,204,733 | 6/1940 | Miller | 23—219 |
| 2,206,399 | 7/1940 | Grosvenor et al. | 23—219 |
| 2,271,056 | 1/1942 | Balcar | 23—219 |
| 2,418,930 | 4/1947 | Gorin | 23—219 |

OSCAR R. VERTIZ, *Primary Examiner.*

BENJAMIN HENKIN, *Examiner.*

E. STERN, *Assistant Examiner.*